United States Patent

Elpern et al.

[15] 3,669,974
[45] June 13, 1972

[54] N,N1-DISUBSTITUTED BENZAMIDINES

[72] Inventors: Bill Elpern, White Plains; James R. Shroff, Bronx, both of N.Y.

[73] Assignee: USV Pharmaceutical Corporation

[22] Filed: March 25, 1971

[21] Appl. No.: 128,125

Related U.S. Application Data

[63] Continuation-in-part of Ser. No. 845,030, July 25, 1969, abandoned.

[52] U.S. Cl. ............ 260/293.79, 260/564 R, 260/294.8 G, 260/296 AE, 260/247.1, 260/247.5 R, 260/326.5 L, 260/326.84, 260/293.73, 260/293.69, 260/268 R, 260/243 B, 260/268 H, 260/247.2 R, 260/326.3, 260/294.8 R, 260/295 R, 260/566 D, 260/296 R, 260/570.7, 260/295.5 R

[51] Int. Cl. .................................................... C07d 29/28

[58] Field of Search ........... 260/564 R, 294.8 G, 296 AE, 260/247.1, 247.5 R, 326.5 L, 326.84, 293.73, 293.79

[56] References Cited

UNITED STATES PATENTS 3,462,446   8/1969   De Wald ..................... 260/296 AE Primary Examiner—Henry R. Jiles
Assistant Examiner—S. D. Winters
Attorney—Leon E. Tenenbaum

[57] ABSTRACT

Compounds of the formula

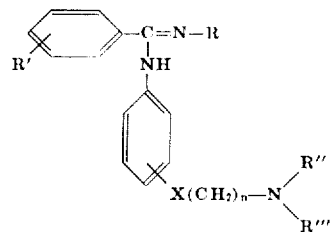

wherein R is lower alkyl, cycloalkyl, phenyl, naphthyl, pyridyl, or substituted phenyl, R' is hydrogen, lower alkyl, lower alkoxy, or halogen,

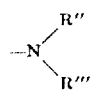

is dialkylamino or a heterocyclic ring, $n$ is an integer from 2–4, and X is oxygen or sulfur, possess hypoglycemic activity.

7 Claims, No Drawings

N,N1-DISUBSTITUTED BENZAMIDINES

This application is a continuation-in-part of our copending application Ser. No. 845,030, filed July 25, 1969, now abandoned.

This invention relates to new organic compounds having valuable pharmacological activity and to processes for the preparation of said compounds. In particular, the invention relates to benzamidines of the formula

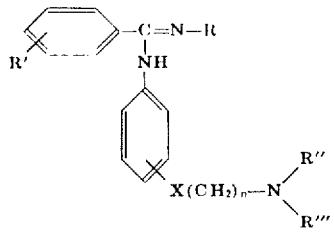

wherein:

R is lower alkyl, cycloalkyl, phenyl, naphthyl, pyridyl, or substituted phenyl;

R' is hydrogen, lower alkyl, lower alkoxy, or halogen;

R'' and R''' are lower alkyl, phenyl or phenyl-lower alkyl and may be the same or different, or when taken together with the nitrogen to which they are attached may be heterocyclic such as morpholino, thiamorpholino, pyrrolidino, piperidino, piperazino, N-methylpiperazino and the like;

X is oxygen or sulfur; and n is an integer from 2 to 4 inclusive; and their pharmaceutically acceptable, non-toxic mono- and diacid addition salts.

The lower alkyl and lower alkoxy groups contain from one to five carbon atoms and may be straight-chained or branched.

The substituted phenyl carries one or more substitutents such as lower alkyl, lower alkoxy, lower alkyl-mercapto, halogen such as bromo-, chloro-, fluoro- or iodo-, and trifluoromethyl.

The cyaloalkyl groups contain from five to seven atoms in the ring which may be substituted with lower alkyl groups.

Preferably, R is phenyl or substituted phenyl such as methoxyphenyl or dimethylphenyl, R' is hydrogen, R'' and R''' taken together with the nitrogen to which they are attached is di-(lower alkyl)-amino, pyrrolidino or piperidino, n is 2 or 3, X is oxygen, and the

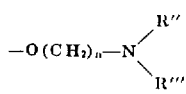

is attached to ring in a position para to the nitrogen of the amidine group.

The pharmaceutically acceptable non-toxic acid addition salts include salts of inorganic acids such as hydrochloric, hydrobromic, sulfuric and phosporic, and organic acids such as acetic, propionic, glycolic, lactic, malonic, succinic, malic, maleic, fumaric, tartaric, citric, ascorbic, benzoic, hydroxybenzoic, aminosalicylic, cinnamic, mandelic, benzenesulfonic, toluenesulfonic, nicotinic, isonicotinic, and the like.

According to a process of this invention the benzamidines were prepared by reacting in an inert solvent an appropriately substituted benzimidoyl chloride with a desirably substituted aminoalkoxy-aniline or aminoalkylmercapto-aniline. The resulting hydrochloride was converted to the free base by treatment with ammonia, which free base could then be converted to the desired acid addition salts.

The intermediate benzimidoyl chlorides were prepared from benzoyl chloride and a desired amine under standard Schotten-Baumann procedure to form the N-substituted benzamide which was converted to the benzimidoyl chloride by treatment with $SOCl_2$ or $PCl_5$ according to published procedures.

The aminoalkoxyanilines were prepared by the reduction of aminoalkoxy-nitrobenzenes which were obtained by the reaction of the sodium salt of a nitrophenol with an aminoalkyl chloride.

The intermediate animoalkylmercapto-anilines were prepared by contacting an aminothiophenol with an appropriately substituted aminoalkyl chloride dihydrochloride in the presence of sodium and ethanol according to the procedure published in J. Med. Chem. 7, 376(1964).

The compounds according to the present invention were also obtained by the reaction in the presence of sodium hydride of an appropriately substituted hydroxyphenyl-benzamidine of the formula

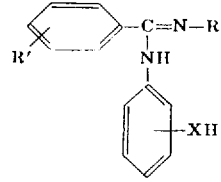

with an amino-alkyl chloride of the formula

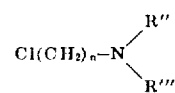

wherein R, R', R'', R''', X and n are same as above.

The invention will be more fully illustrated in the examples which follow, which examples are given by way of illustration and are not to be considered as limiting.

EXAMPLE I a. N'-Phenyl-N-(4 hydroxy-phenyl)benzamidine Hydrochloride

To a suspension of 270 g. (2.5 mol) p-aminophenol in 2,700 cc. acetone, was added, while stirring, 540 g. (2.5 mol) N-phenyl benzimidoyl chloride dissolved in 250 cc. acetone. The reaction was exothermic and the temperature rose to 55°C. After the addition was complete, the reaction mixture was refluxed for 30 minutes. The reaction mixture was cooled to 15°C. and filtered. Recrystallization from methanol-water yielded 353.4 g. of product melting at 289°-91°C.

b) N'-Phenyl-N-[4-(2-pyrrolidinoethoxy)phenyl]-benzamidine Dihydrochloride

To a suspension of 99.7 g. sodium hydride (60 percent) in 470 cc. dry, distilled dimethylformamide, was added 353.4 g. (1.09 mol)N'-phenyl-N-(4-hydroxyphenyl-benzamidine HCl over a period of 1 hr. in the presence of nitrogen gas. The reaction temperature was maintained between 60°-70°C. by means of an ice bath. When the addition was complete, the temperature of the reaction mixture was elevated to 100°-110 °C., and a solution of 186.2 g. (1.43 mol) β-pyrrolidyl-ethyl chloride in 310 cc. toluene was added dropwise to the reaction mixture. The reaction mixture was heated to 180°-200°C. for a period of 8 hrs. and then cooled. The sodium chloride was filtered off and the solvents removed from the filtrate. The residue was extracted with ether, washed with water and dried over anhyd $MgSO_4$. To the dry ether solution HCl gas was bubbled up in to form the dihydrochloride salt. Recrystallization from isopropanol-acetone yielded 320 g. of product melting at 156°-158°C.

EXAMPLE II

N'-phenyl-N[4-(2-pyrrolidinoethoxy)phenyl]-benzamidine Dihyrochloride.

To a solution of 10.75 g. (0.05 mol) N-phenyl-benzimidoyl chloride in 100 cc. dry acetonitrile was added 10.3 g. (0.05 mol) p-[β-(1-pyrrolidyl)ethoxy]-aniline, dissolved in 100 cc.

acetonitrile. The reaction was exothermic and the temperature rose to 43°C. The reaction mixture was gradually heated to the reflux temperature while constantly stirring and maintained at this temperature for a period of 8 hrs. The acetonitrile was distilled off and the crude product neutralized with ammonium hydroxide. The organic material extracted with ether, washed with water and dried over anhyd MgSO$_4$. HCl gas was passed through the ether solution and the dihydrochloride salt crystallized from ethanol-ethyl acetate to yield product in 55 percent yield. M.P. -55–157° C.

EXAMPLE III

N'-Phenyl-N-[4-(2-pyrrolidinoethylthio)phenyl]-benzamidine Dihydrochloride.

To a solution of 11.2 g. (0.05 mol) pyrrolidinoethylthio-p-aniline in 250 cc. acetonitrile was added 10.75 g. (0.05 mol) N-phenyl benzimidoyl chloride dissolved in 250 cc. acetonitrile. The reaction was exothermic and the temperature rose to 48° C. The reaction mixture was gradually heated to reflux temperature while constantly stirring and maintained at this temperature for a period of 8 hours. The acetonitrile was distilled off and the crude product neutralized with ammonium hydroxide. The organic material extracted with ether, and the ethereal solution dried over anhydrous MgSO$_4$. HCl gas passed through the ether solution and the dihydrochloride salt which formed was crystallized from acetonitrile to yield product in 22 percent yield (2.6 g.) M.P. 217°–220° C.

In accordance with the procedures set forth in the above examples, the additional compounds as shown in the table below were prepared. In this table, unless indicated otherwise, the

is attached on the ring in a position para to the amidine nitrogen.

X = O

| R | R' | R'' | R''' | n | Salt (a) | M.P.,° |
|---|---|---|---|---|---|---|
| Me | H | Et | Et | 3 | HBr | 175–77 |
| Me | H | Et | Et | 2 | Oxalate | 114–15 |
| Me | H | Me | Me | 2 | HBr | 241–44 |
| Me | H | | Piperidino | 2 | HBr | 130–33 |
| Me | H | i-Pr | i-Pr | 2 | | 111–13 |
| Me | H | | Pyrrolidino | 2 | HBr | 141–43 |
| Et | H | Et | Et | 2 | Oxalate | 95–96 |
| Et | H | Et | Et | 3 | HBr | 166–68 |
| Et | H | i-Pr | i-Pr | 2 | HBr | 172–74 |
| Et | H | Me | Me | 3 | HCl | 155–58 |
| Et | H | | Morpholino | 2 | HBr | 151–53 |
| i-But | H | | Pyrrolidino | 2 | HBr | 190–92 |
| i-But | H | | Pyrrolidino | 3 | HBr | 195–96 |
| i-But | H | n-But | n-But | 2 | HBr | 112–64 |
| i-But | H | i-Pr | i-Pr | 2 | | 88–90 |
| i-But | H | | Piperidino | 2 | HBr | 211–13 |
| i-But | H | Et | Et | 2 | HBr | 190–92 |
| i-But | H | Et | C$_6$H$_5$CH$_2$ | 2 | HBr | 152–54 |
| i-But | H | Me | Ph | 2 | | 72–74 |
| i-But | H | | Pyrrolidino | 3 | HBr | 195–96 |
| i-But | H | | Pyrrolidino | 4 | HBr | 173–75 |
| Ph | H | | Pyrrolidino b | 2 | | 86–89 |
| Ph | H | | Pyrrolidino c | 2 | | 93–96 |
| Ph | H | | Pyrrolidino | 2 | HCl | 155–57 |
| Ph | H | i-Pr | i-Pr | 2 | HBr | 193–95 |
| Ph | H | Me | Et | 2 | | 106–08 |
| Ph | H | Me | C$_6$H$_5$CH$_2$ | 2 | HBr | 157–60 |
| Ph | H | | Pyrrolidino | 3 | HBr | 216–19 |
| Ph | H | | Morpholino | 2 | HBr | 151–54 |
| Ph | H | Me | Me | 2 | HBr | 227–30 |
| Ph | H | Et | Et | 3 | HBr | 190–92 |
| Ph | H | C$_6$H$_5$CH$_2$ | C$_6$H$_5$CH$_2$ | 2 | HBr | 160–62 |
| Ph | H | Me | Me | 2 | | 227–29 |
| Ph | H | i-Pr | i-Pr | 3 | | 195–97 |
| 4-Cl-C$_6$H$_4$ | H | i-Pr | i-Pr | 2 | | 50–52 |
| 4-Cl-C$_6$H$_4$ | H | i-Pr | i-Pr | 2 | HCl | 235–37 |
| 4-Cl-C$_6$H$_4$ | H | | Piperidino | 2 | HCl | 182–85 |
| 4-Cl-C$_6$H$_4$ | H | | Piperidino | 3 | HCl | 145–48 |
| 4-Cl-C$_6$H$_4$ | H | | Pyrrolidino | 2 | HBr | 214–16 |
| 4-Cl-C$_6$H$_4$ | H | | Pyrrolidino b | 2 | HBr | 220–23 |
| 4-Cl-C$_6$H$_4$ | H | | Pyrrolidino | 3 | HBr | 260–63 |
| 4-Cl-C$_6$H$_4$ | H | | Pyrrolidino | 2 | HBr | 220–23 |
| 4-F-C$_6$H$_4$ | H | | Pyrrolidino | 3 | HCl | 259–60 |
| 4-F-C$_6$H$_4$ | H | i-Pr | i-Pr | 3 | HBr | 233–35 |
| 3-F$_3$C-C$_6$H$_4$ | H | i-Pr | i-Pr | 3 | HCl | 140–41 |
| 3-F$_3$C-C$_6$H$_4$ | H | Me | Ph | 2 | | 60–62 |
| 3-F$_3$C-C$_6$H$_4$ | H | Et | Et | 3 | HCl | 186–89 |
| 3-F$_3$C-C$_6$H$_4$ | H | n-But | n-But | 2 | HBr | 190–92 |
| 3-F$_3$C-C$_6$H$_4$ | H | | Pyrrolidino | 3 | HBr | 170–75 |
| 3-F$_3$C-C$_6$H$_4$ | H | | Pyrrolidino | 2 | HBr | 200–03 |
| C$_6$H$_{11}$ d | H | Et | Et | 2 | HBr | 200–02 |
| C$_6$H$_{11}$ | H | Et | Et | 3 | HBr | 207–09 |
| C$_6$H$_{11}$ | H | i-Pr | i-Pr | 2 | | 86–87 |
| C$_6$H$_{11}$ | H | | Pyrrolidino | 2 | HBr | 225–26 |
| C$_6$H$_{11}$ | H | | Pyrrolidino | 3 | HBr | 168–70 |
| C$_6$H$_{11}$ | H | | Pyrrolidino b | 2 | HBr | 273–75 |
| C$_6$H$_{11}$ | H | | Pyrrolidino e | 2 | HBr | 278–80 |
| C$_6$H$_{11}$ | H | n-But | n-But | 2 | HBr | 178–80 |
| C$_6$H$_{11}$ | H | Me | Me | 3 | HBr | 193–95 |
| C$_6$H$_{11}$ | H | | Piperidino | | HBr | 250–53 |
| C$_6$H$_{11}$ | H | Me | Ph | 2 | | 91–92 |
| C$_6$H$_{11}$ | H | Me | C$_6$H$_5$CH$_2$ | 2 | HBr | 227–29 |
| 2-Py e | H | Et | Et | 2 | | 76–78 |
| 2-Py | H | | Pyrrolidino | 2 | | 127–29 |
| 2-Py | H | | Piperidino | 2 | | 143–44 |
| 2-Py | H | Me | Ph | 2 | | 105–07 |
| 2-Py | H | Et | Et | 3 | | 69–71 |
| 4-Py | H | | Piperidino | 2 | | 75–78 |
| 4-Py | H | Et | Et | 2 | | 70–72 |
| 4-Py | H | Me | C$_6$H$_5$CH$_2$ | 2 | | 112–15 |
| n-Hex | H | Et | Et | 2 | | r200–04/0.02 |
| Ph | H | n-But | n-But | 2 | HCl | 130–34 |
| Ph | H | Et | Et | 2 | Oxalate | 158–60 |
| Ph | H | | Piperidino | 2 | HBr | 174–76 |
| Ph | H | | Piperidino | 3 | HBr | 243–246 |
| Ph | H | | Pyrrolidino | 2 | HCl | 156–58 |
| Ph | H | | Pyrrolidino | 3 | HBr | 253–56 |
| Ph | H | | Pyrrolidino | 4 | HBr | 252–54 |

X = O

| R | R' | R'' | R''' | n | Salt (a) | M.P.,° |
|---|---|---|---|---|---|---|
| 2,3-(CH₃)₂C₆H₃ | H | \multicolumn{2}{l|}{Hexamethyleneimino} | 2 | HCl | 196-98 |
| 2,3-(CH₃)₂C₆H₃ | H | Me | Ph | 2 | | 158-60 |
| 2,3-(CH₃)₂C₆H₃ | H | i-Pr | i-Pr | 2 | | 115-17 |
| 2,3-(CH₃)₂C₆H₃ | H | \multicolumn{2}{l|}{Pyrrolidino} | 2 | HBr | 230-32 |
| 2,3-(CH₃)₂C₆H₃ | H | \multicolumn{2}{l|}{Pyrrolidino} | 3 | HBr | 184-86 |
| 2,3-(CH₃)₂C₆H₃ | H | \multicolumn{2}{l|}{Piperidino} | 2 | HBr | 179-82 |
| 2,3-(CH₃)₂C₆H₃ | H | \multicolumn{2}{l|}{Piperidino} | 3 | HBr | 227-28 |
| 2,3-(CH₃)₂C₆H₃ | H | Me | Me | 3 | HBr | 150-52 |
| 4-MeO-C₆H₄ | H | \multicolumn{2}{l|}{Pyrrolidino} | 2 | HBr | 220-22 |
| 4-MeO-C₆H₄ | H | \multicolumn{2}{l|}{Pyrrolidino} | 3 | HBr | 250-52 |
| 4-MeO-C₆H₄ | H | \multicolumn{2}{l|}{Piperidino} | 2 | HBr | 222-24 |
| 1-Naph | H | \multicolumn{2}{l|}{Pyrrolidino} | 2 | HBr | 165-68 |
| 1-Naph | H | \multicolumn{2}{l|}{Piperidino} | 2 | | 112-115 |
| 1-Naph | H | Me | Ph | 2 | | 155-57 |
| 2-Naph | H | \multicolumn{2}{l|}{Pyrrolidino} | 3 | HBr | 240-42 |
| Ph | 3-MeO | \multicolumn{2}{l|}{Pyrrolidino} | 3 | HBr | 129-31 |
| Ph | 3-MeO | Me | Ph | 2 | | 92-94 |
| Ph | 4-MeO | \multicolumn{2}{l|}{Pyrrolidino} | 2 | HCl | 184-86 |
| Ph | 4-MeO | \multicolumn{2}{l|}{Pyrrolidino} | 3 | HBr | 182-84 |
| Ph | 4-MeO | \multicolumn{2}{l|}{Piperidino} | 2 | HBr | 221-24 |
| Ph | 3,4-Cl₂ | \multicolumn{2}{l|}{Pyrrolidino} | 3 | HBr | 238-40 |
| Ph | 4-F | \multicolumn{2}{l|}{Piperidino} | 2 | HCl | 216-18 |
| Ph | 4-F | \multicolumn{2}{l|}{Pyrrolidino} | 2 | HBr | 221-23 |
| Ph | 4-Cl | \multicolumn{2}{l|}{Piperidino} | 3 | HCl | 248-50 |
| 4-MeO-C₆H₄ | 4-Me | \multicolumn{2}{l|}{Pyrrolidino} | 2 | HBr | 226-29 |
| 4-MeO-C₆H₄ | 4-Me | \multicolumn{2}{l|}{Pyrrolidino} | 3 | HBr | 154-56 |
| 4-Me-C₆H₄ | 4-Me | \multicolumn{2}{l|}{Pyrrolidino} | 3 | HBr | 242-43 |
| 4-Me-C₆H₄ | 4-Me | \multicolumn{2}{l|}{Piperidino} | 3 | HCl | 214-18 |
| 4-F-C₆H₄ | 4-Fl | \multicolumn{2}{l|}{Piperidino} | 3 | HBr | 248-50 |

X = S

| R | R' | R'' | R''' | n | Salt (a) | M.P.,° |
|---|---|---|---|---|---|---|
| Ph | H | \multicolumn{2}{l|}{Pyrrolidino} | 2 | HCl | 217-220 |
| Ph | H | i-Pr | i-Pr | 2 | HCl | 212-215 | a Where no salt is given, the melting point is that of the free base.
b The amino-alkoxy group is meta to the amino group.
c The amino-alkoxy group is ortho to the amino group.
d C₆H₁₁ signifies cyclohexyl.
e Py signifies pyridyl.
f Boiling point.

The compounds of this invention are potent hypoglycemic agents showing a reduction in the level of blood glucose in glucose primed rats of up to about 40 percent at oral dosages of about 100 mg./kg. In monkeys similar studies showed a reduction of from about 32 to 45 percent at 60 mg./kg. This property makes these compounds particularly useful in the treatment of diabetes.

Certain compounds of this invention, particularly wherein R is phenyl, R' is hydrogen and

is pyrrolidyl showed strong anti-inflammatory activity by the standard carrageenan, cotton pellet and UV erythema tests.

The novel compounds of this invention can be combined with solid or liquid pharmaceutical carriers and formulated into tablets, powders, or capsules or dissolved in suitable solvents for oral and parenteral administration for human or veterinary use.

The amidine nucleus in the novel compounds of this invention can exist in the tautomeric forms

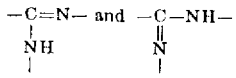

and NMR data have established that these forms exist in the presence of each other.

We claim:
1. A compound of the formula

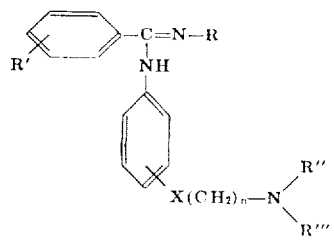

wherein:
R is lower alkyl, cycloalkyl, having from five to seven atoms, phenyl, naphthyl, pyridyl, or a substituted phenyl wherein the substituent is selected from the group consisting of lower alkyl, lower alkoxy, halogen, or trifluoromethyl;
R' is hydrogen, lower alkyl, lower alkoxy, or halogen;
R'' and R''' are lower alkyl, phenyl or phenyl-lower alkyl and may be the same or different, or R'' and R''' taken together with the nitrogen to which they are attached may be morpholino, pyrrolidino or piperidino;
X is oxygen or sulfur; and
n is an integer from 2-4 inclusive,
and its pharmaceutically acceptable, non-toxic acid addition salts.

2. A compound according to claim 1, wherein
R is phenyl or substituted phenyl,
R' is hydrogen,
R'' and R''' taken together with the N to which they are attached is di-(lower alkyl)-amino, pyrrolidino, or piperidino,
n is 2 or 3,
X is oxygen, and
the

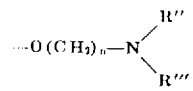

group is attached in a position para to the nitrogen of the amidine group.

3. A compound according to claim 2, wherein
R is phenyl,
R' is hydrogen,
R'' and R''' are isopropyl, and
n is 2.

4. A compound according to claim 2, wherein
R is phenyl,
R' is hydrogen,
R'' and R''' are isopropyl, and
n is 3.

5. A compound according to claim 2, wherein
R is p-methoxyphenyl,
R' is hydrogen,

is pyrrolidino, and
n is 2.
6. A compound according to claim 2, wherein
R is phenyl,
R' is hydrogen,
is pyrrolidino, and
n is 3.
7. A compound according to claim 2 wherein
R is 2,3-dimethyl-phenyl,
R' is hydrogen,
is piperidyl, and
n is 3.
* * * * *